United States Patent
Shalev et al.

(10) Patent No.: US 9,411,728 B2
(45) Date of Patent: Aug. 9, 2016

(54) METHODS AND APPARATUS FOR EFFICIENT COMMUNICATION BETWEEN CACHES IN HIERARCHICAL CACHING DESIGN

(75) Inventors: Ron Shalev, Ceaseria (IL); Yiftach Gilad, Givat Ada (IL); Shlomo Raikin, Ofer (IL); Igor Yanover, Nesher (IL); Stanislav Shwartsman, Haifa (IL); Raanan Sade, Kibutz Sarid (IL)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 13/994,399

(22) PCT Filed: Dec. 23, 2011

(86) PCT No.: PCT/US2011/067217
§ 371 (c)(1),
(2), (4) Date: Jun. 14, 2013

(87) PCT Pub. No.: WO2013/095640
PCT Pub. Date: Jun. 27, 2013

(65) Prior Publication Data
US 2013/0326145 A1 Dec. 5, 2013

(51) Int. Cl.
*G06F 13/00* (2006.01)
*G06F 12/08* (2016.01)
(Continued)

(52) U.S. Cl.
CPC ............ *G06F 12/0811* (2013.01); *G06F 12/08* (2013.01); *G06F 12/0844* (2013.01); *G06F 12/0897* (2013.01); *G06F 13/14* (2013.01); *G06F 13/38* (2013.01)

(58) Field of Classification Search
CPC combination set(s) only.
See application file for complete search history.

(56) References Cited

U.S. PATENT DOCUMENTS

| 5,732,244 A | * | 3/1998 | Gujral | ................. G06F 12/0833 709/238 |
| 5,926,484 A | * | 7/1999 | Takusagawa | ....... G06F 12/0804 711/118 |

(Continued)

FOREIGN PATENT DOCUMENTS

| CN | 101008920 A | 8/2007 |
| JP | 2001236221 A | 8/2001 |

(Continued)

OTHER PUBLICATIONS

PCT International Search Report for PCT Counterpart Application No. PCT/US2011/067217, 3 pgs., (Aug. 30, 2012).

(Continued)

*Primary Examiner* — Charles Rones
*Assistant Examiner* — Han Doan
(74) *Attorney, Agent, or Firm* — Nicholson De Vos Webster & Elliott LLP

(57) ABSTRACT

In accordance with embodiments disclosed herein, there are provided methods, systems, mechanisms, techniques, and apparatuses for implementing efficient communication between caches in hierarchical caching design. For example, in one embodiment, such means may include an integrated circuit having a data bus; a lower level cache communicably interfaced with the data bus; a higher level cache communicably interfaced with the data bus; one or more data buffers and one or more dataless buffers. The data buffers in such an embodiment being communicably interfaced with the data bus, and each of the one or more data buffers having a buffer memory to buffer a full cache line, one or more control bits to indicate state of the respective data buffer, and an address associated with the full cache line. The dataless buffers in such an embodiment being incapable of storing a full cache line and having one or more control bits to indicate state of the respective dataless buffer and an address for an inter-cache transfer line associated with the respective dataless buffer. In such an embodiment, inter-cache transfer logic is to request the inter-cache transfer line from the higher level cache via the data bus and is to further write the inter-cache transfer line into the lower level cache from the data bus.

22 Claims, 13 Drawing Sheets

(51) Int. Cl.
*G06F 13/14* (2006.01)
*G06F 13/38* (2006.01)

(56) References Cited

U.S. PATENT DOCUMENTS

| | | | | |
|---|---|---|---|---|
| 6,226,713 | B1* | 5/2001 | Mehrotra | G06F 12/0859 711/109 |
| 7,305,397 | B2 | 12/2007 | Spencer, Jr. | |
| 7,512,742 | B2 | 3/2009 | Clark et al. | |
| 2003/0177315 | A1* | 9/2003 | Hooker | G06F 9/30047 711/137 |
| 2006/0112233 | A1 | 5/2006 | Hu et al. | |
| 2006/0224833 | A1 | 10/2006 | Guthrie et al. | |
| 2006/0268626 | A1* | 11/2006 | Hamzaoglu et al. | 365/189.04 |
| 2009/0216949 | A1 | 8/2009 | Krumm et al. | |
| 2009/0313435 | A1* | 12/2009 | Thantry | G06F 12/0828 711/120 |
| 2010/0030965 | A1 | 2/2010 | Hutton et al. | |
| 2011/0231593 | A1 | 9/2011 | Yasufuku et al. | |
| 2011/0238925 | A1* | 9/2011 | Robinson | G06F 12/084 711/141 |
| 2011/0271057 | A1* | 11/2011 | Karlsson | G06F 12/0855 711/122 |
| 2013/0238912 | A1* | 9/2013 | Priel | G06F 1/324 713/300 |

FOREIGN PATENT DOCUMENTS

| | | | |
|---|---|---|---|
| JP | 3533355 | B2 | 5/2004 |
| JP | 2008525919 | A | 7/2008 |
| JP | 2011198091 | A | 10/2011 |
| JP | 5063104 | B2 | 10/2012 |

OTHER PUBLICATIONS

PCT Written Opinion of the International Searching Authority for PCT Counterpart Application No. PCT/US2011/067217, 5 pgs., (Aug. 30, 2012).
PCT Notification concerning Transmittal of International Preliminary Report on Patentability (Chapter I of the Patent Cooperation Treaty) for PCT Counterpart Application No. PCT/US2011/067217, 7 pgs., (Jul. 3, 2014).
Japanese Office Action for Counterpart Japanese Patent Application No. 2013-550479, dated May 7, 2014.
Office action with English translation from Chinese Patent Application No. 201180066503.3, mailed May 5, 2015, 10 pages.
Office action from Chinese Patent Application No. 201180066503.3, mailed Mar. 11, 2016, 17 pages.
Notice of Allowance with English translation from Japanese Patent Application No. 2013-550479, mailed Sep. 2, 2014, 4 pages.
Office action from Korean Patent Application No. 2013-7022974, mailed Jul. 23, 2014, 4 pages.
Notice of Allowance with English translation from Korean Patent Application No. 2013-7022974, mailed Jan. 8, 2015, 3 pages.
Notice of Allowance with English translation from Taiwan Patent Application No. 101149054, mailed Aug. 26, 2014, 4 pages.
Office action with English translation from Japanese Patent Application No. 2014-222819, mailed Mar. 15, 2016, 3 pages.

\* cited by examiner

500

1000

METHODS AND APPARATUS FOR EFFICIENT COMMUNICATION BETWEEN CACHES IN HIERARCHICAL CACHING DESIGN

CROSS-REFERENCE TO RELATED APPLICATION

This patent application is a U.S. National Phase Application under 35 U.S.C. §371 of International Application No. PCT/US2011/067217, filed Dec. 23, 2011, entitled METHODS AND APPARATUS FOR EFFICIENT COMMUNICATION BETWEEN CACHES IN HIERARCHICAL CACHING DESIGN.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the field of computing, and more particularly, to systems and methods for implementing efficient communication between caches in hierarchical caching design.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed subject matter.

Conventional hierarchical caching design requires that cache requests from a higher level cache first allocate a buffer and then issue a subsequent request to the higher level cache of the specific cache line that is required. Later, when the required cache line arrives, it is written into the buffer previously allocated. When the request from the higher level cache is completed and all necessary request attributes returned to the allocated buffer now having the cache line required, the buffer is made ready for a replace operation such that the required cache line now stored in the allocated buffer can be inserted or replaced into the lower level cache. At this stage, the required cache line is not in the lower level cache where it is required, but rather, it is buffered and is now ready to be placed into the lower level cache.

A scheduler will later pick the allocated buffer having the required cache line from among all existing buffers in a ready state, and then the required cache line will be moved from the buffer and into the lower level cache via either a replace (e.g., eviction of another cache line) or an insert. The allocated buffer is no longer required and thus, is de-allocated, and at this stage, the required cache line is available within the lower level cache to whatever entity, operation, or requestor requires the cache line.

Because the replace or insert operation of the required cache line into the lower level cache must utilize a free read and write port to perform its insertion, all other cache stores and cache load operations with the cache are stalled to free the necessary read and write port, thus permitting the insertion of the required cache line into the lower level cache to proceed.

The conventionally implemented protocol for retrieving a cache line from a higher level cache into a lower level cache where it is required therefore suffers from at least two major problems. First, low throughput for such requests is exhibited due to a long buffer lifetime. Secondly, brutal or forced read and write port takeovers degrade performance yet are required in every instance.

The present state of the art may therefore benefit from systems and methods for implementing efficient communication between caches in hierarchical caching design as described herein.

BRIEF DESCRIPTION OF THE DRAWINGS

Embodiments are illustrated by way of example, and not by way of limitation, and will be more fully understood with reference to the following detailed description when considered in connection with the figures in which.

DETAILED DESCRIPTION

Figure 1:
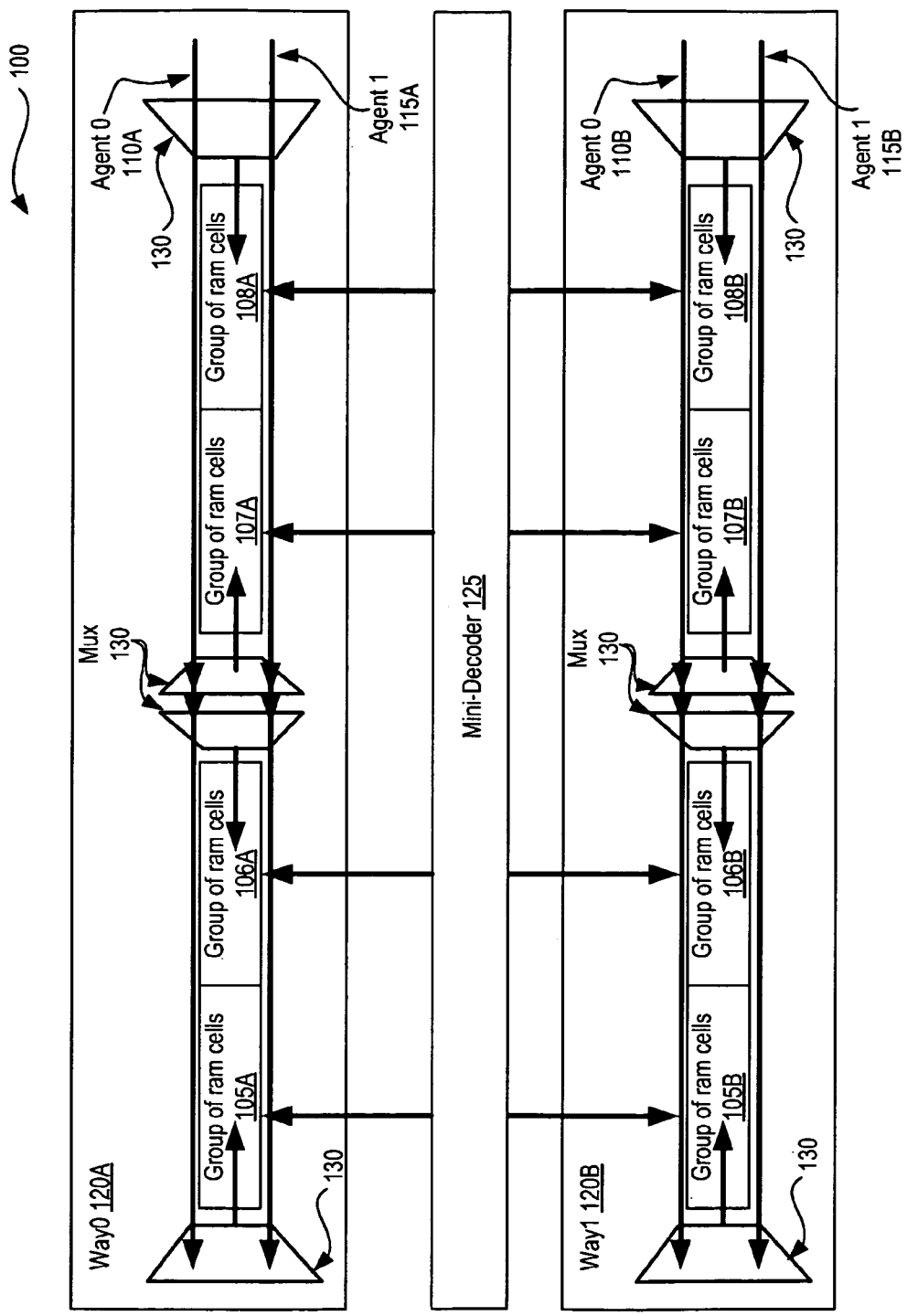
FIG. 1 illustrates an exemplary architecture in accordance with which embodiments may operate.

Described herein are systems and methods for implementing efficient communication between caches in hierarchical caching design. For example, in one embodiment, such means may include an integrated circuit having a data bus; a lower level cache communicably interfaced with the data bus; a higher level cache communicably interfaced with the data bus; one or more data buffers and one or more dataless buffers. The data buffers in such an embodiment being communicably interfaced with the data bus, and each of the one or more data buffers having a buffer memory to buffer a full cache line, one or more control bits to indicate state of the respective data buffer, and an address associated with the full cache line. The dataless buffers in such an embodiment being incapable of storing a full cache line and having one or more control bits to indicate state of the respective dataless buffer and an address for an inter-cache transfer line associated with the respective dataless buffer. In such an embodiment, inter-cache transfer logic is to request the inter-cache transfer line from the higher level cache via the data bus and is to further write the cache line into the lower level cache from the data bus.

Generally speaking, memory closer to the CPU may be accessed faster. Memory within a CPU may be referred to as cache, and may be accessible at different hierarchical levels, such as Level 1 cache (L1 cache) and Level 2 cache (L2 cache). System memory such as memory modules coupled with a motherboard may also be available, such externally available memory which is separate from the CPU but accessible to the CPU may be referred to as, for example, off-chip cache or Level 3 cache (L3 cache), and so on, however, this is not always consistent as a third hierarchical level of cache (e.g., L3 cache) may be on-chip or "on-die" and thus be internal to the CPU.

CPU cache, such as L1 cache, is used by the central processing unit of a computer to reduce the average time to access memory. The L1 cache is a smaller, faster memory which stores copies of the data from the most frequently used main memory locations. L2 cache may be larger, but slower to access. And additional memory, whether on-chip or externally available system memory used as cache may be larger still, but slower to access then smaller and closer CPU cache levels. As long as most memory accesses are cached memory locations, the average latency of memory accesses will be closer to the cache latency than to the latency of main memory.

When the processor needs to read from or write to a location in main memory, it first checks whether a copy of that data is in one of its caches (e.g., L1, L2 caches, etc.) and when available, the processor reads from or writes to the cache instead of seeking the data from a system's main memory, thus providing a faster result than reading from or writing to main memory of the system.

Conventional mechanisms restrict throughput to caches due to a long buffer lifetime. Improved throughput is attainable by modifying the mechanisms for which a replace operation is implemented. For example, improved efficiencies in throughput and communication between, for example, L1 cache and L2 cache on a CPU or between L2 cache on a CPU and externally accessible L3 cache, can improve overall operational efficiency for the CPU and associated chipset.

Conventional solutions require that when a line is replaced into a cache, that a buffer be allocated for a missed cache (e.g., the data is not present in the cache), and then the request for that data goes to an upper level cache, such as to an L2 cache rather than an L1 cache, or to an L3 cache rather than L2 cache, etc. The request then proceeds to the upper level cache, responsive to which the requested data is returned and then stored in the allocated buffer where a scheduler will coordinate a replace operation for the retrieved data now buffered to insert the retrieved data into the lower level cache. So as to perform this replace operation, stores and loads to the cache are stalled to free up read and write ports, at which point the data retrieved from the higher level cache is then inserted into the lower level cache via a replace operation, performing an eviction as necessary.

Shortening the buffer lifetime or the number of steps required to perform such an inter-cache transfer is therefore desirable as a reduction in the number of steps will yield increased efficiency. Also, because every inter-cache request to move data from a higher level to a lower level requires the interruption of stores and loads, system degradation is realized due to the interruption of other process flows and operations. It is therefore also desirable to enable such inter-cache data transfers to move data without necessitating the stoppage of ongoing stores and loads to the caches.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 illustrates an exemplary architecture 100 in accordance with which embodiments may operate. In accordance with the described embodiments, the depicted architecture 100 implements efficient communication between caches in hierarchical caching design.

Efficiency can be improved by eliminating brutal take over events for the write ports by a scheduler needing to write buffered cache lines into a cache. A straight forward way to eliminate a cache write port takeover is to add another cache write port. However, doing so is very costly in terms of area on the integrated circuit and also power on the integrated circuit.

In accordance with the disclosed embodiments, cells, such as memory cells or "ram cells" for storing cache lines of cached data may be organized into groups. Agents can then write or read from the groups through a multiplexer (mux). For example, a concurrent replace or a store operations may write together to a set-associative cache through the mux without having to add a second write port to support the second concurrent replace or store operation.

Mux'ing the write operations concurrently into distinct groups enables greater throughput without having to increase hardware, for example, by adding additional write ports. Increasing the number of groups allows more concurrent write/write, read/read, or write/read operations to the groups of ram cells, however, each grouping requires the introduction of additional mux per group.

As depicted, the architecture 100 supports four sets of groups per way. For example, Way0 120A may be a lower level cache or a level 1 cache (L1 cache) and Way1 120B may be a higher level cache or a level 2 cache (L2 cache).

Each of Way0 and Way1 120A-B includes four groups of ram cells to store cache lines. Way0 120A includes groups of ram cells 105A, 106A, 107A, and 108A. Way1 120B similarly includes four groups of ram cells 105B, 106B, 107B, and 108B. The groups of ram cells of each Way0 and Way1 are connected through multiplexers or muxes 130, which in turn are managed by agents. Agent 0 110A and Agent 1 115A manage input/output operations to Way0 120A. For example, two concurrent write, update, insert, load, store, or read operations are supported via the two agents 110A and 115A through the muxes 130 when writing to distinct and different groups of ram cells 105A-108A through each groups' respectively coupled mux 130 as depicted.

Agent 0 110B and agent 1 115B of Way1 120B similarly support input/output operations into the groups of ram cells 105B-108B of Way1 120B through the respectively coupled muxes 130 of each group of ram cells as depicted.

Each of Way0 and Way1 are interconnected through the mini-decoder 125 which sends different write enables to each one of the groups of ram cells 105A-108A and 105B-108B as well as to the different ways 120A-B, thus enabling both sources of, for example, a write operation, to write at the same time to different group of ram cells and ways. For example, two sources of data are muxed before each group of sets (ram-cells), thus enabling writing of both sources at the same time to different group of sets (ram-cells).

Figure 2:
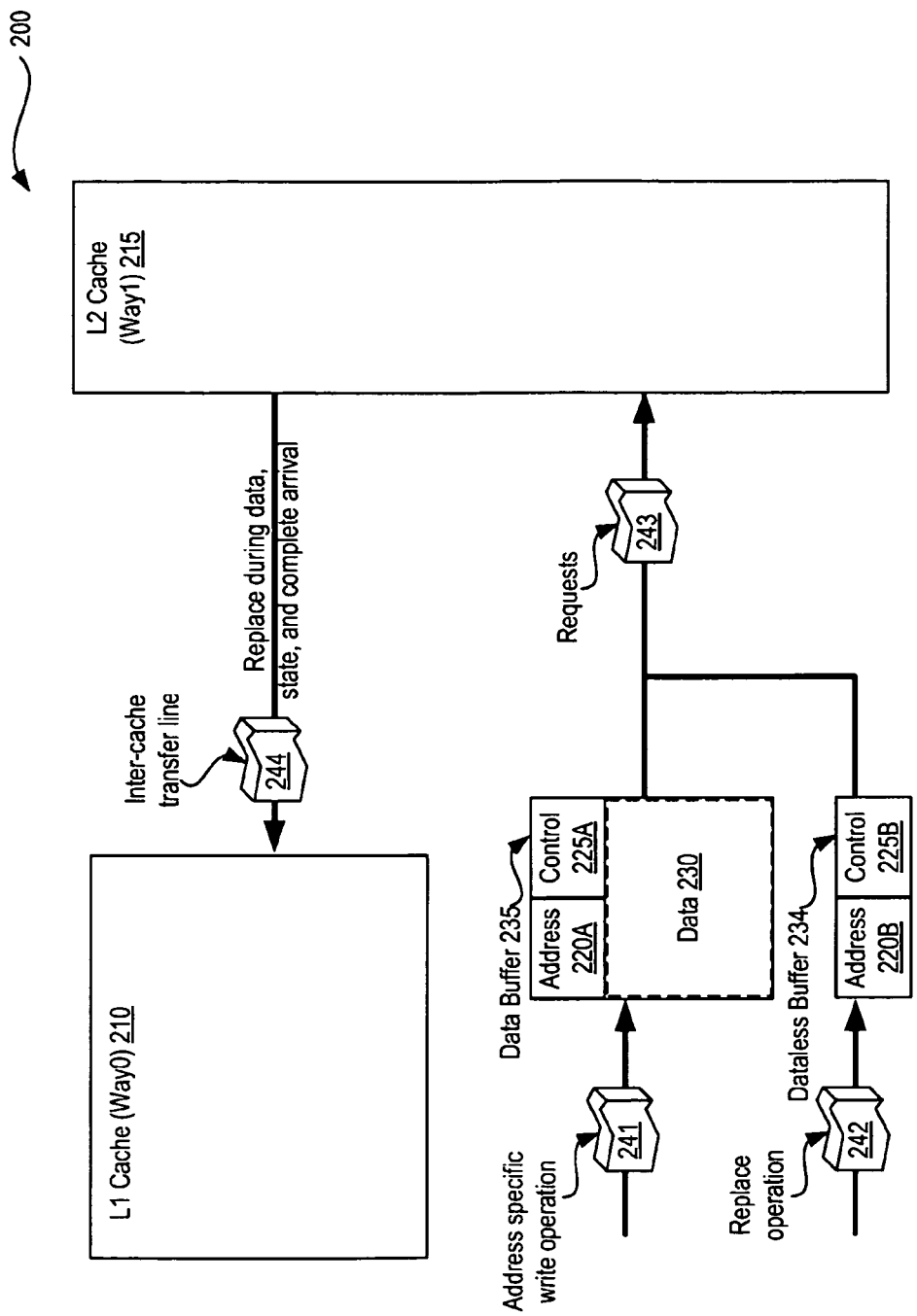
FIG. 2 illustrates an alternative exemplary architecture in accordance with which embodiments may operate.

FIG. 2 illustrates an alternative exemplary architecture 200 in accordance with which embodiments may operate. Here the intercommunication between two exemplary cache levels is depicted in accordance with the disclosed embodiments. For example, L1 cache 210 (e.g., Way0) and L2 cache 215 (e.g., Way1) are depicted, as are a data buffer 235 having an address 220A block and a control 225A block or bits. Notably, data buffer 235 includes a data block 230 capable to store an entire cache line. The data block 230 is the most resource intensive portion of the data buffer 235 requiring both proportionally more power and area of an implementing integrated circuit. Introducing more data buffers 235 requires allocation of more power and area on such an integrated circuit and most of this additional power and area is consumed by the data block 230 portion of each data buffer 235 in order to store or buffer a complete cache line.

Additionally depicted is a dataless buffer 234. Dataless buffer 234 also includes an address 220B block and a control 225B block or bits. Notably, dataless buffer 234 lacks the data block 230 of data buffer 235. Dataless buffer 234 is much smaller in terms of area on an implementing circuit as there is no need for a data block 230 and additionally consumes proportionally less power in contrast to the depicted data buffer 235. However, dataless buffer 234 is simply incapable of storing a full cache line. The dataless buffer, despite the nomenclature of a "buffer" cannot buffer a cache line because it lacks the data block 230 by which to house, store, buffer, or hold such a cache line. Each of the data buffer 235 and the dataless buffer 234 therefore serve distinct purposes, as will be described in further detail below.

For most requests from a cache, data arrives in a single chunk and line state bits stored within the control 225A-B blocks indicate an exclusive or shared state for the cache line corresponding to the requested data. The line state bits are used to indicate completion of a request operation for data from a higher level cache to a lower level. Recognizing cases where line state bits indicate completion of a cache line request, logic can initiate a replace operation upon the arrival of data and immediately perform the replace operation upon arrival of the data, thus bypassing the data buffer 235 and additionally negating the need for a scheduler to monitor the data buffer 235 and subsequently retrieve the cache line from the data buffer's 235 data block 230 and move it into the cache, such as into L1 cache 210. Instead, a dataless buffer 234 can be allocated so that the address 220B and control 225B information may be tracked appropriately, but because the cache line retrieved from the higher level cache, such as the L2 cache 215 is never buffered by a data buffer 235, dataless buffer 234 does not require a data block 230, and instead, the dataless buffer may be immediately deallocated and the retrieved cache line is directed into the L1 cache 210, bypassing any intermediate buffering operation. Such a scheme is more efficient and additionally shortens the pipeline lifetime for an inter-cache transfer of a cache line.

Dataless buffers 234 are thus utilized for any request which a received cache line from a higher level cache is replaced immediately into the lower level cache. Where necessary, data buffers 235 may still be utilized to receive and buffer cache lines that cannot be written directly and immediately into the respective cache. For example, where the requested cache line must be directed toward a particular address, and contention exists for interacting with the cache, the cache line may be temporarily buffered in the data buffer 235 having a respective data storage component via the data block 230, such that a scheduler may arrange to secure access to a write port necessary to write the buffered cache line into the appropriate address space of the cache.

Replace operations are more flexible than address specific writes insomuch that inter-cache transfer logic is not restricted in where the requested cache line must be written into the lower level cache, and thus, a portion of the cache, such as one of the groups of ram cells 105A-108A depicted at FIG. 1 within the lower level or L1 cache 210 which is not under contention may be selected for the insertion of the retrieved cache line into the cache upon receipt.

Thus, in accordance with one embodiment, address specific write operations 241 are presented to data buffers 235 having a data block 230 component sufficient to store a cache line and replace operations 242 are presented to dataless buffers 234 which lack a data block 230 component as the replace operation will not require buffering services of the cache line. Request 243 is shown being communicated to the L2 cache 215, subsequent to which a replace during data, state and complete arrival is processed directly to L1 cache 210 as illustrated by the inter-cache transfer line 244 communicated from L2 cache 215 to L1 cache 210.

Figure 3:
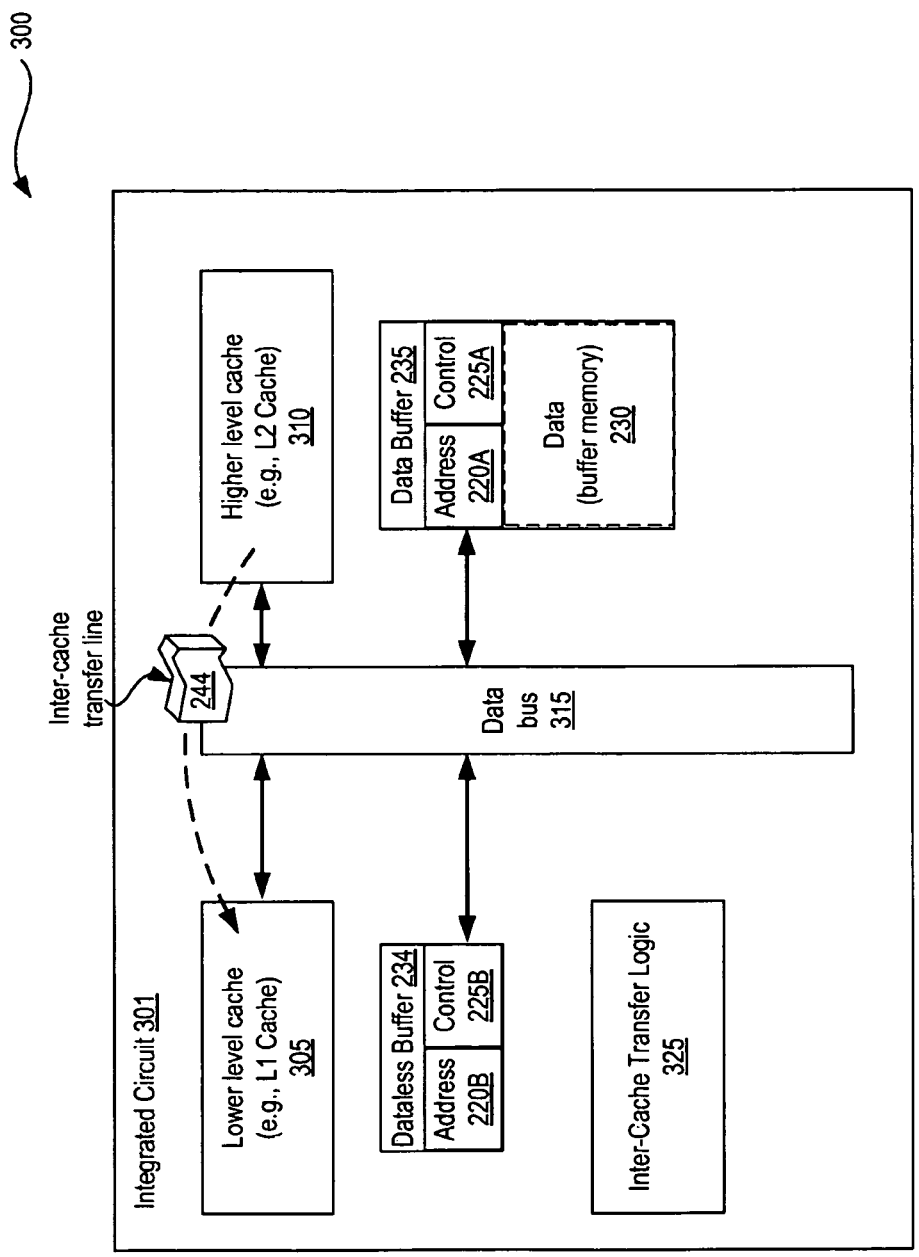
FIG. 3 illustrates another alternative exemplary architecture in accordance with which embodiments may operate.

FIG. 3 illustrates another alternative exemplary architecture 300 in accordance with which embodiments may operate. For example, an integrated circuit 301 is depicted in accordance with one embodiment, in which the integrated circuit includes a data bus 315; a lower level cache 305 communicably interfaced with the data bus 315; a higher level cache 310 communicably interfaced with the data bus 315; one or more data buffers 235 communicably interfaced with the data bus 315; one or more dataless buffers 234 communicably interfaced with the data bus 315, and inter-cache transfer logic 325. Additionally shown are the sub-components of the data buffer 235 including address 220A and control 225A as well as a data block 230 component to store a cache line, and the sub-components of the dataless buffer 234 including address 220B and control 225B, but notably, dataless buffer 234 lacks a data block 230 component to store a cache line. Lastly, inter-cache transfer line 244 is depicted as being transferred from the higher level cache 310 to the lower level cache 305.

In accordance with one embodiment, each of the one or more data buffers 235 include a buffer memory (data block 230) to buffer a full cache line, one or more control 225A bits to indicate state of the respective data buffer 235, and an address 220A associated with the full cache line.

In one embodiment, each of the one or more dataless buffers 234 is incapable of storing a full cache line. Such dataless buffers 234 include one or more control 225B bits to indicate state of the respective dataless buffer 234 and an address 220B for an inter-cache transfer line 244 associated with the respective dataless buffer 234. By including only the control 225B and the address 220B for the respective dataless buffer 234 in contrast to the data buffer 235 having the additional data block 230 component (e.g., buffer memory), the number of buffers can be dramatically increased without having to allocate substantial power and area of the integrated circuit 301 as would be required if additional data buffers 235 having such a data block 230 component were incorporated into the integrated circuit 301. There is no need to queue or buffer the inter-cache transfer line 244 because the transfer is done on the fly, by requesting the data, and directing the requested inter-cache transfer line 244 from the data bus 315 directly into the lower level cache 305 rather than into a buffer or queue, thus causing a write back to the lower level cache 305 to occur upon data arrival of the inter-cache transfer line 244. Although a dataless buffer 234 may be allocated in support of the inter-cache transfer function, the resource cost of the control 225B and address 220B required for the dataless buffer 234 is small in comparison to a data buffer 235 capable of buffering the inter-cache transfer line 244 as part of the inter-cache transfer.

In one embodiment, the inter-cache transfer logic 325 is to request the inter-cache transfer line 244 from the higher level cache 310 via the data bus 315 and the inter-cache transfer logic 325 is to further write the inter-cache transfer line 244 into the lower level cache 305 from the data bus 315.

In one embodiment, requesting the inter-cache transfer line includes (1) the inter-cache transfer logic 325 to allocate one of the one or more dataless buffers 234 to the inter-cache transfer line 244 responsive to a cache miss at the lower level cache 305; and further includes (2) the inter-cache transfer logic 325 to direct the inter-cache transfer line 244 from the data bus 315 directly into the lower level cache 305, bypassing the allocated dataless buffer. For example, the inter-cache transfer line 244 is placed onto the data bus 315 responsive to the request and then, rather than directing the inter-cache transfer line 244 into buffer memory, the inter-cache transfer line 244 is instead transmitted directly from the data bus 315 and into the lower level cache 305.

In one embodiment, the inter-cache transfer logic 325 requests the inter-cache transfer line 244 responsive to a cache miss at the lower level cache 305. For example, such a cache miss may trigger the inter-cache transfer function to engage where the requested cache line is available at a higher level cache such as the L2 cache 310 depicted or at even higher levels, such as at an L3 cache, either on-chip or off-chip relative to the integrated circuit 301. In one embodiment, the lower level cache 305 is an on-chip level 1 cache (L1 cache) incorporated within the integrated circuit 301; and the higher level cache 310 is an on-chip level 2 cache (L2 cache) incorporated within the integrated circuit 301. In an alternative embodiment, the on-chip level 1 cache or the on-chip level 2 cache further communicates with an off-chip level 3 cache (L3 cache) to perform inter-cache transfers from the L3 cache into one of the on-chip level 1 cache or the on-chip level 2 cache.

In accordance with one embodiment, directing the inter-cache transfer line 244 directly into the lower level cache 305 further includes the inter-cache transfer logic 325 initiating a replace operation to insert the inter-cache transfer line 244 into the lower level cache 305. In one embodiment, the replace operation is initiated concurrently with the request for the inter-cache transfer line 244 from the higher level cache 310. In order to shorten the lifetime of the inter-cache transfer function over conventionally available mechanisms, it is desirable to remove certain functional operations. One of those operations is buffering as noted above. Another such operation that may be removed to improve efficiency is the wait period that occurs between receipt of a requested inter-cache transfer line 244 and the subsequent scheduling of a replacement operation. In accordance with the disclosed embodiments, such a replacement operation is triggered concurrently or simultaneously with the initiation of the request for the inter-cache transfer line 244 which reduces the timing lag experienced in conventional techniques. By triggering the replacement operation with the request of the inter-cache transfer line 244, the replacement operation is enabled to capture the returned inter-cache transfer line 244 once placed upon the data bus 315 and simply direct it into the lower level cache 310 which both reduces the overall lifetime of the inter-cache transfer functional pipeline and additionally negates the need for any buffering step or operation. Using such a technique, a scheduler is not even required to monitor buffer memory as the inter-cache transfer line 244 is never placed into the buffer memory. In practice however, not all inter-cache transfer functions permit bufferless operation. For example, where contention issues to the target cache force buffering or additional time is required to handle special cases, buffering may still be utilized and the scheduler can monitor and subsequently perform the necessary transfer of a buffered cache line from buffer memory (e.g., data block 230 of data buffer 235) and into the target cache.

In one embodiment, the replace operation includes selecting a cache line for eviction from the lower level cache 305 based at least in part on the cache line for eviction residing within a portion of the lower level cache 305 for which there is no present contention and further includes directing the inter-cache transfer line 244 into a location made available through the eviction of the cache line. Such a replace operation may utilize the address 220B of the dataless buffer 234 which is associated with the inter-cache transfer line 244. A mapping may further be provided to a target destination within the target cache, such as lower level cache 305 using the associated address 220B. The inter-cache transfer logic 325 may determine whether contention is present for a targeted portion of the target cache. For example, groups of ram cells 105A-108A were described previously. Some may be unavailable while others may be available for an input/output operation. The inter-cache transfer logic 325 may determine where contention exists and does not exist, and then secure a read/write port (e.g., through one of the agents 110A and 115A) and then evict a cache line and cause the requested and retrieved inter-cache transfer line 244 to be stored in the location freed up by the eviction of the cache line. Such contention determination may be based on, policy, real-time monitoring, address ranges, etc. In one embodiment, the inter-cache transfer logic 325 allocates one of the plurality of data buffers 235 to buffer the evicted cache line and directs the evicted cache line into the allocated data buffer for final disposition based on the eviction policy (e.g., clearing dirty bits, syncing, etc.).

In one embodiment, the lower level cache 305 includes a plurality of memory cells arranged into two or more groups; and each of the two or more groups is accessed through a multiplexer (mux) enabling simultaneous write/write, read/read, or write/read operations to two distinct memory cells of the respective group. For example, the memory cells (e.g., such as ram cells, etc.) may be divided between 8, 16, or 64 groups, etc. Too large of groupings increases contention. Too small of groupings causes increased overhead and additional hardware requirements due to the required muxes. Therefore, some analysis is appropriate to model the appropriate number of groupings for a given circuit implementation. Once divided into groups, write/write, read/read, or read/write operations can be directed to the memory cells through the muxes (and the agents as necessary) so long as both are directed to two distinct groups. For example, two replacement operations, two load operations, two store operations, etc., may be performed so long as they are not directed toward a single group of the memory cells.

In one embodiment, the inter-cache transfer logic 325 to write the inter-cache transfer line 244 into the lower level cache 305 from the data bus 315 includes the inter-cache transfer logic 325 to (1) identify one of the two or more groups for which a write operation is available; (2) select the identified group; and (3) direct an agent responsible for the selected group to write the inter-cache transfer line 244 from the data bus 315 into the selected group. Thus, a contention determination may identify an available group, and responsively select that group for fulfillment of the replacement operation.

In an alternative embodiment, the inter-cache transfer logic 325 to write the inter-cache transfer line 244 into the lower level cache 305 from the data bus 315 includes the inter-cache transfer logic 325 to (1) identify contention on all of the two or more groups; (2) stall write operations into one of the groups; and (2) direct an agent responsible for the group associated with the stalled write operations to write the inter-cache transfer line 244 from the data bus 315 into the group.

Stalling of write operations may be referred to as a brutal take over of the read/write port. It is necessary to have a read/write port available for a selected location, such as a memory cell within a group within the targeted lower level cache 305 such that the selected location is ready and waiting to receive the inter-cache transfer line 244 from the upper level cache 310 upon receipt so as to operate in a bufferless inter-cache transfer mode. When data arrives from the upper level cache there needs to be a location waiting capable for an immediate writeback, and thus, where necessary, a load port or read/write port is stalled in preparation of the arrival. Although a stall may sometimes occur in accordance with some embodiments, such a stall is triggered concurrently with the request of the inter-cache transfer line 244 and combined into a single cycle and thus, is much shorter in time when compared with conventional mechanisms which perform a request, buffer, schedule, stall, and then move the buffered data, thus requiring more than a single cycle to reach the same result.

In one embodiment, a cache update for an existing cache line stored in the lower level cache 305 or the higher level cache 310 is buffered in one of the one or more data buffers 235 and a scheduler monitoring the one or more data buffers 235 secures an available write port to the lower level cache 305 or the higher level cache 310 associated with the existing cache line and writes the cache update into the lower level cache 305 or the higher level cache 310 to replace the existing cache line.

In one embodiment, the inter-cache transfer line 244 returned from the higher level cache 310 includes a full cache line and control data. In such an embodiment, the dataless buffer 234 stores the control data via the one or more control 225B bits. In one embodiment, the respective dataless buffer does not store the full cache line returned with the control data.

In one embodiment, the integrated circuit 301 includes a central processing unit for one of a tablet computing device or a smartphone.

Figure 4:
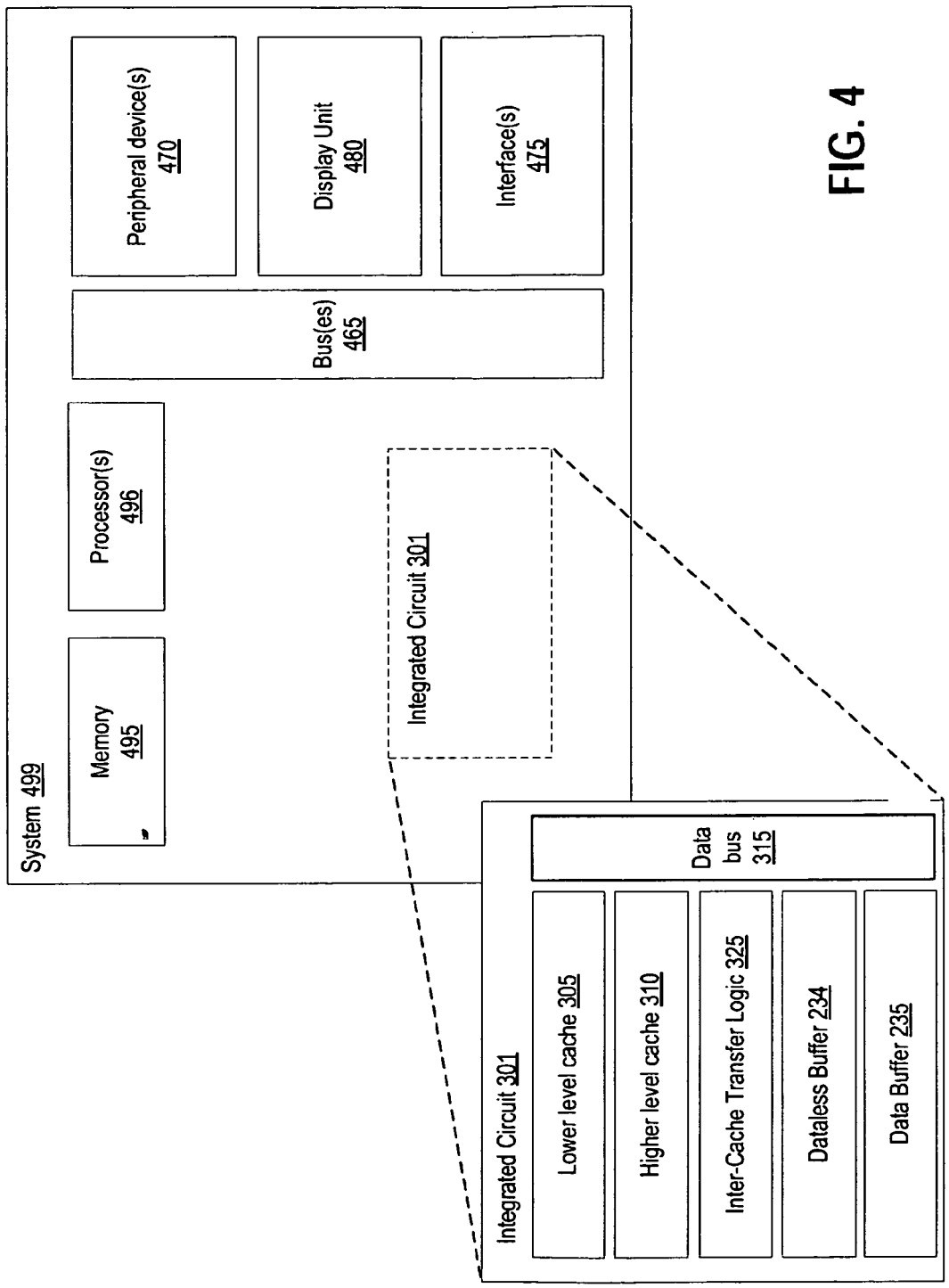
FIG. 4 shows a diagrammatic representation of a system in accordance with which embodiments may operate, be installed, integrated, or configured.

FIG. 4 shows a diagrammatic representation of a system 499 in accordance with which embodiments may operate, be installed, integrated, or configured.

In one embodiment, system 499 includes a memory 495 and a processor or processors 496. For example, memory 495 may store instructions to be executed and processor(s) 496 may execute such instructions. System 499 includes communication bus(es) 465 to transfer transactions, instructions, requests, and data within system 499 among a plurality of peripheral device(s) 470 communicably interfaced with one or more communication buses 465 and/or interface(s) 475. Display unit 480 is additionally depicted within system 499.

Distinct within system 499 is integrated circuit 301 which may be installed and configured in a compatible system 499, or manufactured and provided separately so as to operate in conjunction with appropriate components of system 499.

In accordance with one embodiment, system 499 includes at least a display unit 480 and an integrated circuit 301. The integrated circuit 301 may operate as, for example, a processor or as another computing component of system 499. In such an embodiment, the integrated circuit 301 of system 499 includes at least: a data bus; a lower level cache communicably interfaced with the data bus; a higher level cache communicably interfaced with the data bus; and one or more data buffers communicably interfaced with the data bus, each of the one or more data buffers having a buffer memory to buffer a full cache line, one or more control bits to indicate state of the respective data buffer, and an address associated with the full cache line. In such an embodiment, the integrated circuit 301 of system 499 further includes one or more dataless buffers incapable of storing a full cache line and having one or more control bits to indicate state of the respective dataless buffer and an address for an inter-cache transfer line associated with the respective dataless buffer. The integrated circuit 301 of system 499 additionally includes inter-cache transfer logic to request the inter-cache transfer line from the higher level cache via the data bus and to write the inter-cache transfer line into the lower level cache from the data bus.

In one embodiment, system 499 embodies a tablet or a smartphone and the display unit 480 is a touchscreen interface for the tablet or the smartphone. In such an embodiment, the integrated circuit 301 is incorporated into the tablet or smartphone, for example, as a processor or other computing component for the tablet or smartphone.

Figure 5:
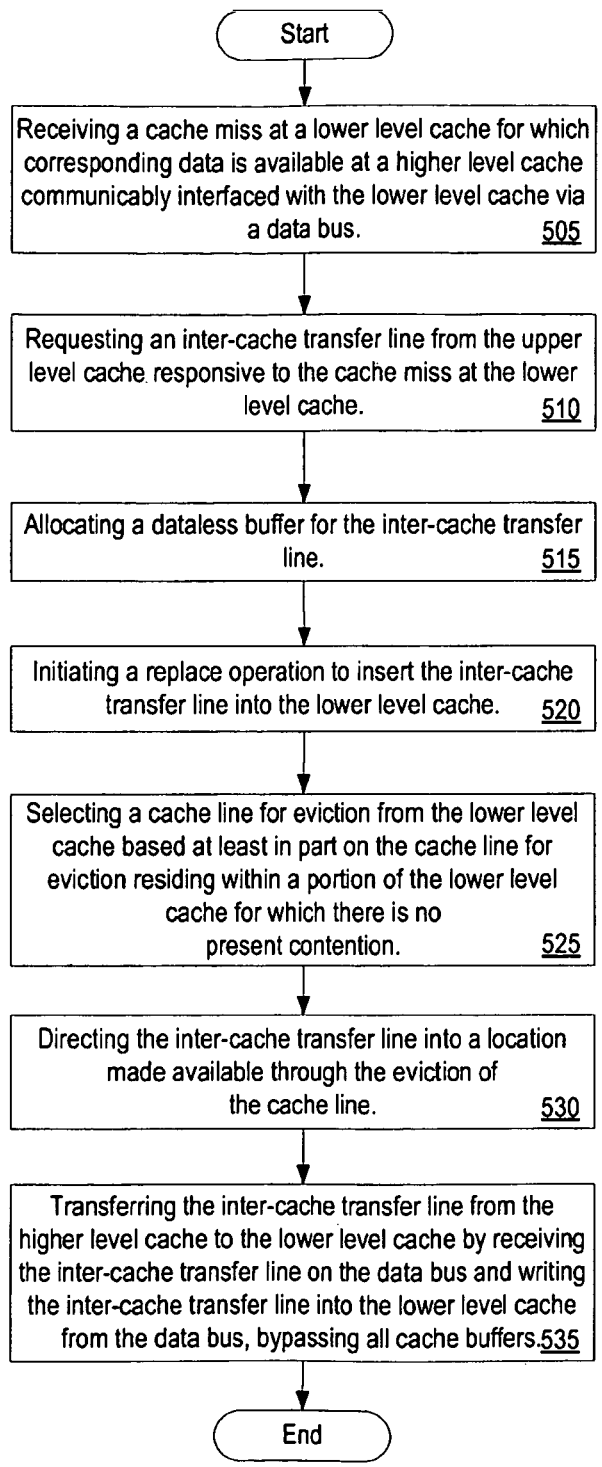
FIG. 5 is a flow diagram illustrating a method for implementing efficient communication between caches in hierarchical caching design in accordance with described embodiments.

FIG. 5 is a flow diagram illustrating a method for implementing efficient communication between caches in hierarchical caching design in accordance with described embodiments. Method 500 may be performed by processing logic that may include hardware (e.g., circuitry, dedicated logic, programmable logic, microcode, etc.). The numbering of the blocks presented is for the sake of clarity and is not intended to prescribe an order of operations in which the various blocks must occur.

Method 500 begins with processing logic for receiving a cache miss at a lower level cache for which corresponding data is available at a higher level cache communicably interfaced with the lower level cache via a data bus (block 505).

At block 510, processing logic requests an inter-cache transfer line from the upper level cache responsive to the cache miss at the lower level cache.

At block 515, processing logic allocates a dataless buffer for the inter-cache transfer line.

At block 520, processing logic initiates a replace operation to insert the inter-cache transfer line into the lower level cache.

At block 525, processing logic selects a cache line for eviction from the lower level cache based at least in part on the cache line for eviction residing within a portion of the lower level cache for which there is no present contention.

At block 530, processing logic directs the inter-cache transfer line into a location made available through the eviction of the cache line.

At block 535, processing logic transfers the inter-cache transfer line from the higher level cache to the lower level cache by receiving the inter-cache transfer line on the data bus and writing the inter-cache transfer line into the lower level cache from the data bus, bypassing all cache buffers.

Figure 6:
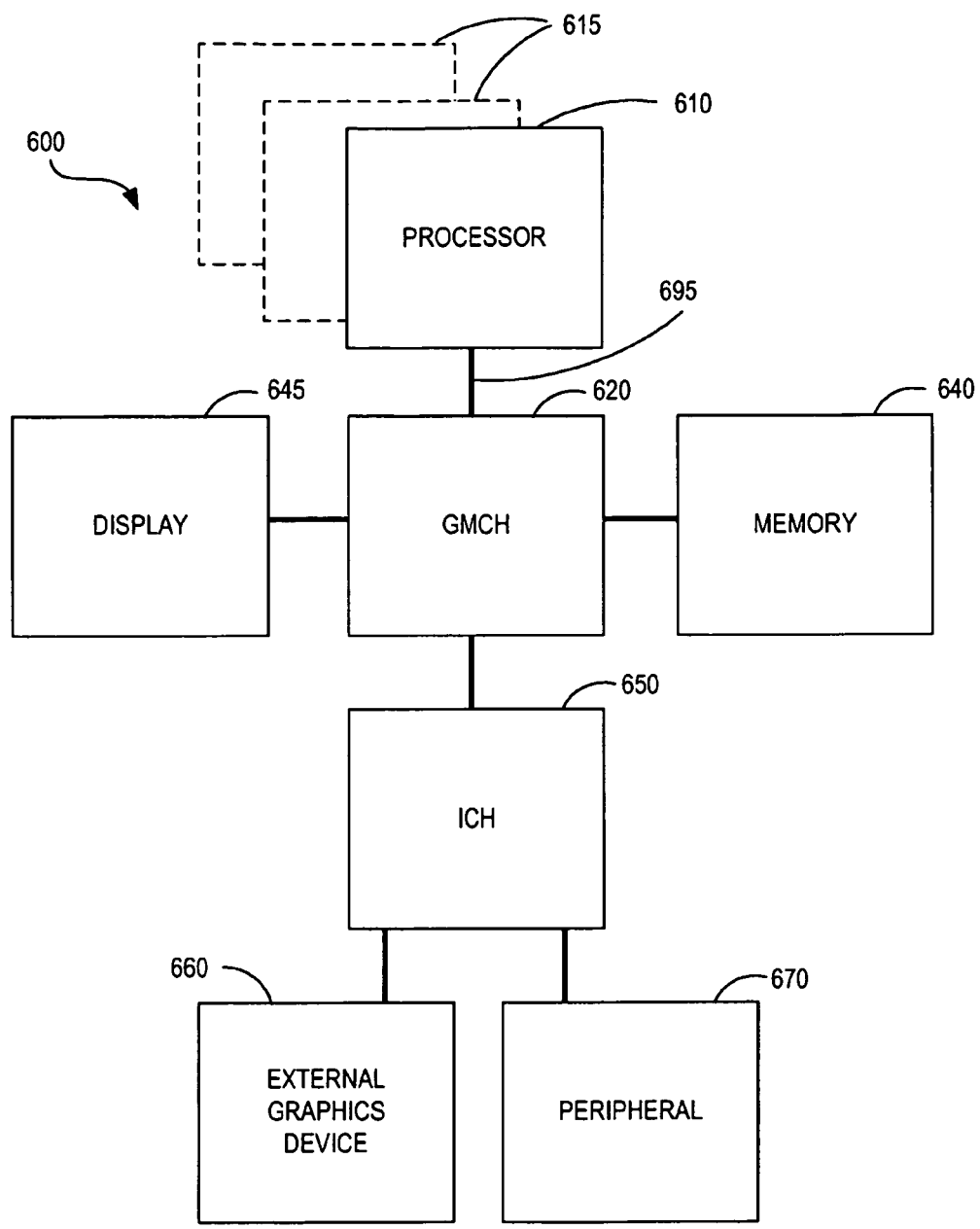
FIG. 6 is a block diagram of a computer system according to one embodiment.

Referring now to FIG. 6, shown is a block diagram of a system 600 in accordance with one embodiment of the present invention. The system 600 may include one or more processors 610, 615, which are coupled to graphics memory controller hub (GMCH) 620. The optional nature of additional processors 615 is denoted in FIG. 6 with broken lines.

Each processor 610, 615 may be some version of the circuit, integrated circuit, processor, and/or silicon integrated circuit as described above. However, it should be noted that it is unlikely that integrated graphics logic and integrated memory control units would exist in the processors 610, 615. FIG. 6 illustrates that the GMCH 620 may be coupled to a memory 640 that may be, for example, a dynamic random access memory (DRAM). The DRAM may, for at least one embodiment, be associated with a non-volatile cache.

The GMCH 620 may be a chipset, or a portion of a chipset. The GMCH 620 may communicate with the processor(s) 610, 615 and control interaction between the processor(s) 610, 615 and memory 640. The GMCH 620 may also act as an accelerated bus interface between the processor(s) 610, 615 and other elements of the system 600. For at least one embodiment, the GMCH 620 communicates with the processor(s) 610, 615 via a multi-drop bus, such as a frontside bus (FSB) 695.

Furthermore, GMCH 620 is coupled to a display 645 (such as a flat panel or touchscreen display). GMCH 620 may include an integrated graphics accelerator. GMCH 620 is further coupled to an input/output (I/O) controller hub (ICH) 650, which may be used to couple various peripheral devices to system 600. Shown for example in the embodiment of FIG. 6 is an external graphics device 660, which may be a discrete graphics device coupled to ICH 650, along with another peripheral device 670.

Alternatively, additional or different processors may also be present in the system 600. For example, additional processor(s) 615 may include additional processors(s) that are the same as processor 610, additional processor(s) that are heterogeneous or asymmetric to processor 610, accelerators (such as, e.g., graphics accelerators or digital signal processing (DSP) units), field programmable gate arrays, or any other processor. There can be a variety of differences between the processor(s) 610, 615 in terms of a spectrum of metrics of merit including architectural, micro-architectural, thermal, power consumption characteristics, and the like. These differences may effectively manifest themselves as asymmetry and heterogeneity amongst the processors 610, 615. For at least one embodiment, the various processors 610, 615 may reside in the same die package.

Figure 7:
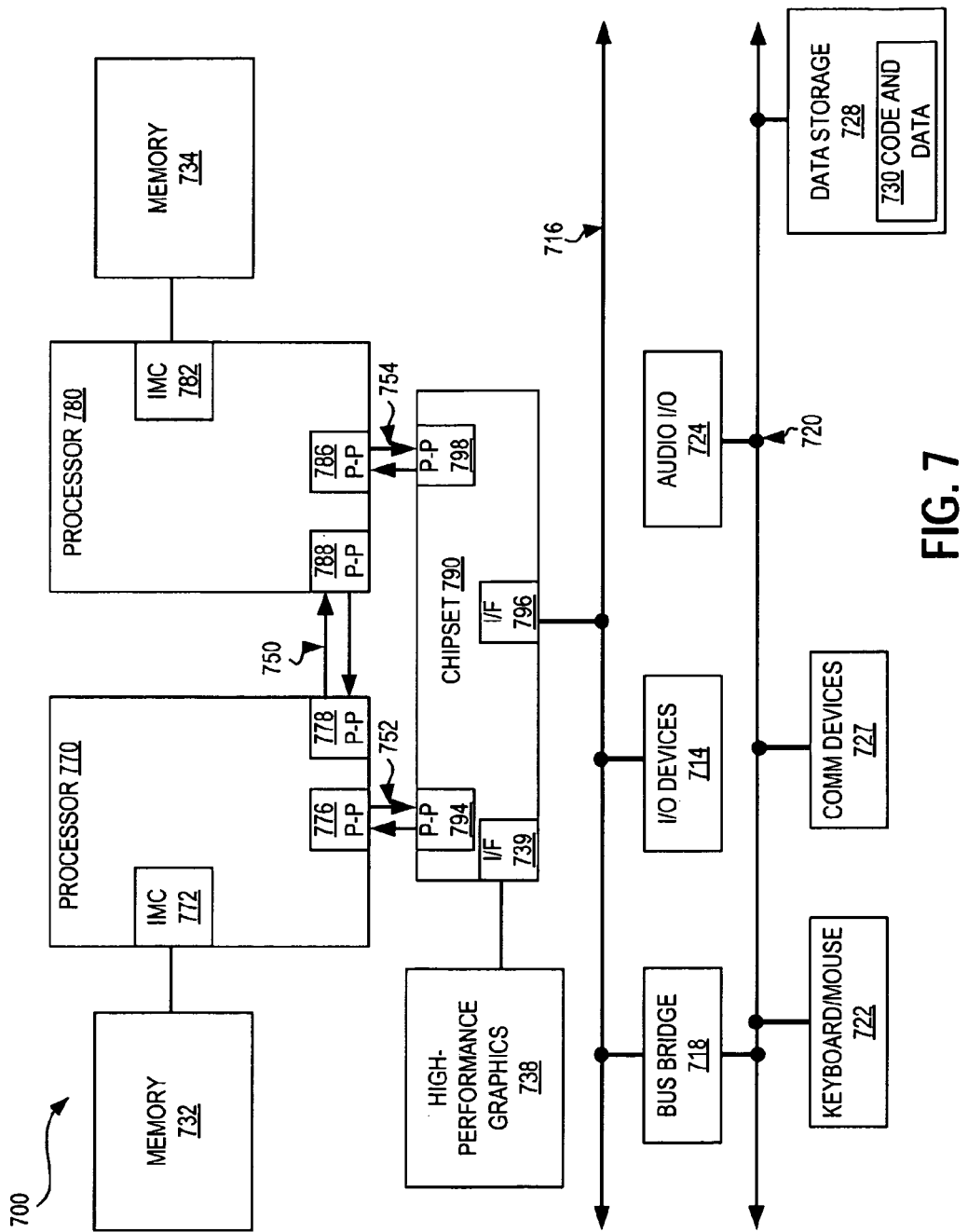
FIG. 7 is a block diagram of a computer system according to one embodiment.

Referring now to FIG. 7, shown is a block diagram of a second system 700 in accordance with an embodiment of the present invention. As shown in FIG. 7, multiprocessor system 700 is a point-to-point interconnect system, and includes a first processor 770 and a second processor 780 coupled via a point-to-point interface 750. Each of processors 770 and 780 may be some version of the processors or integrated circuits as previously described or as one or more of the processors 610, 615.

While shown with only two processors 770, 780, it is to be understood that the scope of the present invention is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
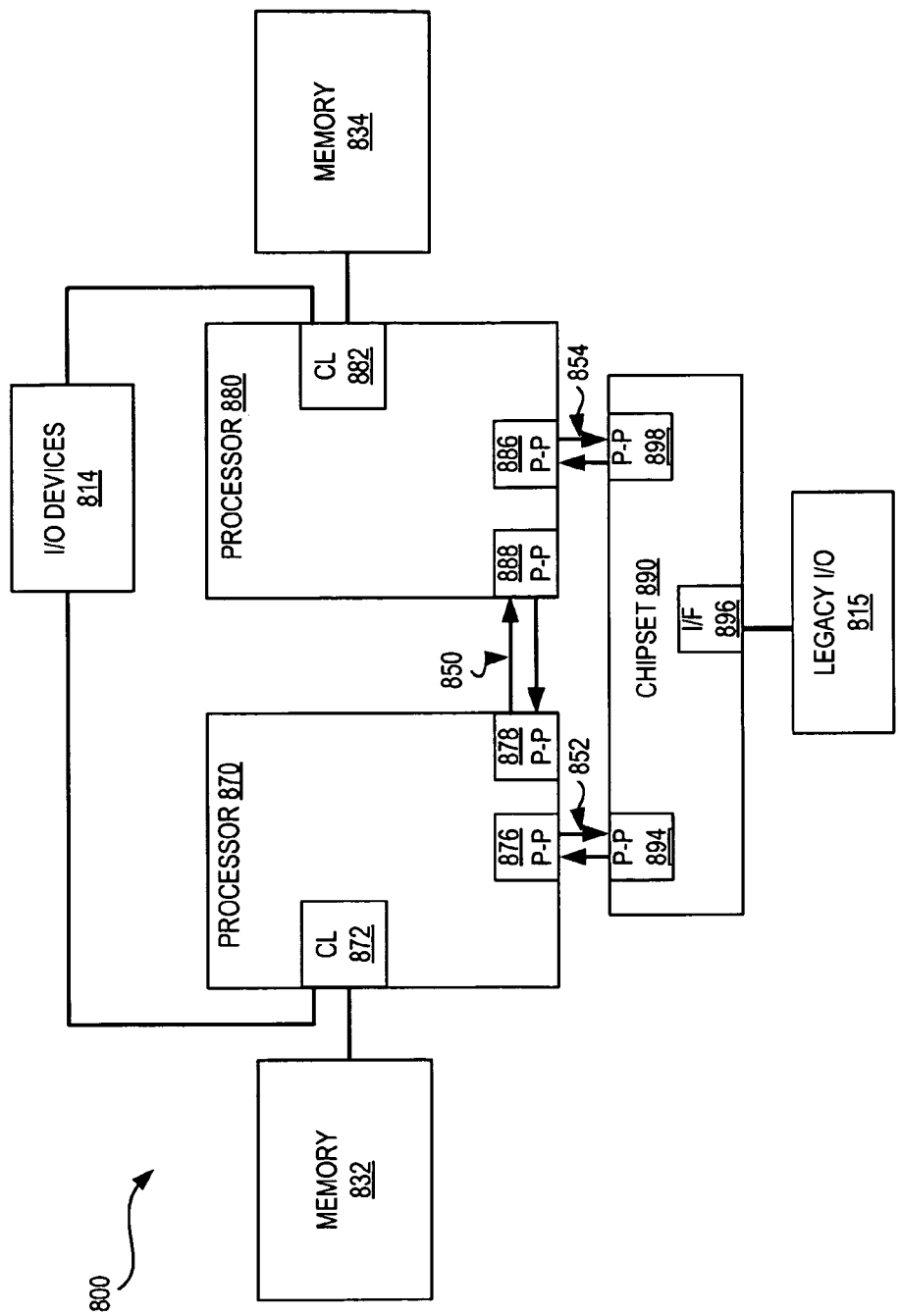
FIG. 8 is a block diagram of a computer system according to one embodiment.

Referring now to FIG. 8, shown is a block diagram of a system 800 in accordance with an embodiment of the present invention. FIG. 8 illustrates that the processors 870, 880 may include integrated memory and I/O control logic ("CL") 872 and 882, respectively and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units. CLs 872, 882 may include I/O control logic. As depicted, memories 832, 834 coupled to CLs 872, 882 and I/O devices 814 are also coupled to the control logic 872, 882. Legacy I/O devices 815 are coupled to the chipset 890 via interface 896.

Figure 9:
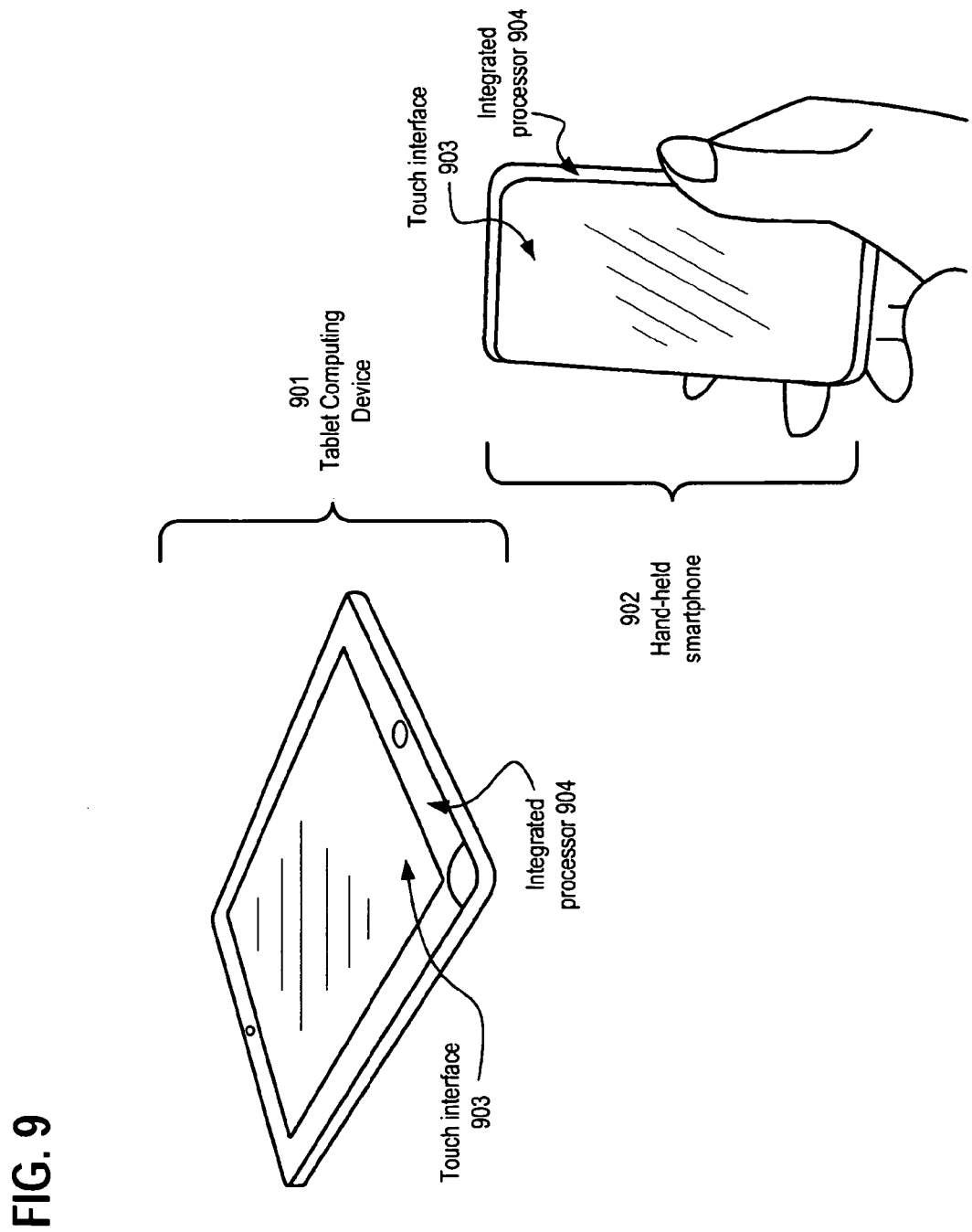
FIG. 9 depicts a tablet computing device and a hand-held smartphone each having a circuitry integrated therein as described in accordance with the embodiments.

FIG. 9 depicts a tablet computing device 901 and a handheld smartphone 902 each having a circuitry integrated therein as described in accordance with the embodiments. As depicted, each of the tablet computing device 901 and the hand-held smartphone 902 include a touchscreen interface 903 and an integrated processor 904 in accordance with disclosed embodiments.

For example, in one embodiment, a system embodies a tablet computing device 901 or a hand-held smartphone 902, in which a display unit of the system includes a touchscreen interface 903 for the tablet or the smartphone and further in which memory and an integrated circuit operating as an integrated processor are incorporated into the tablet or smartphone, in which the integrated processor implements one or more of the embodiments described herein for implementing efficient communication between caches in hierarchical caching design. In one embodiment, the integrated circuit described above or the depicted integrated processor of the tablet or smartphone is an integrated silicon processor functioning as a central processing unit for a tablet computing device or a smartphone.

Figure 10:
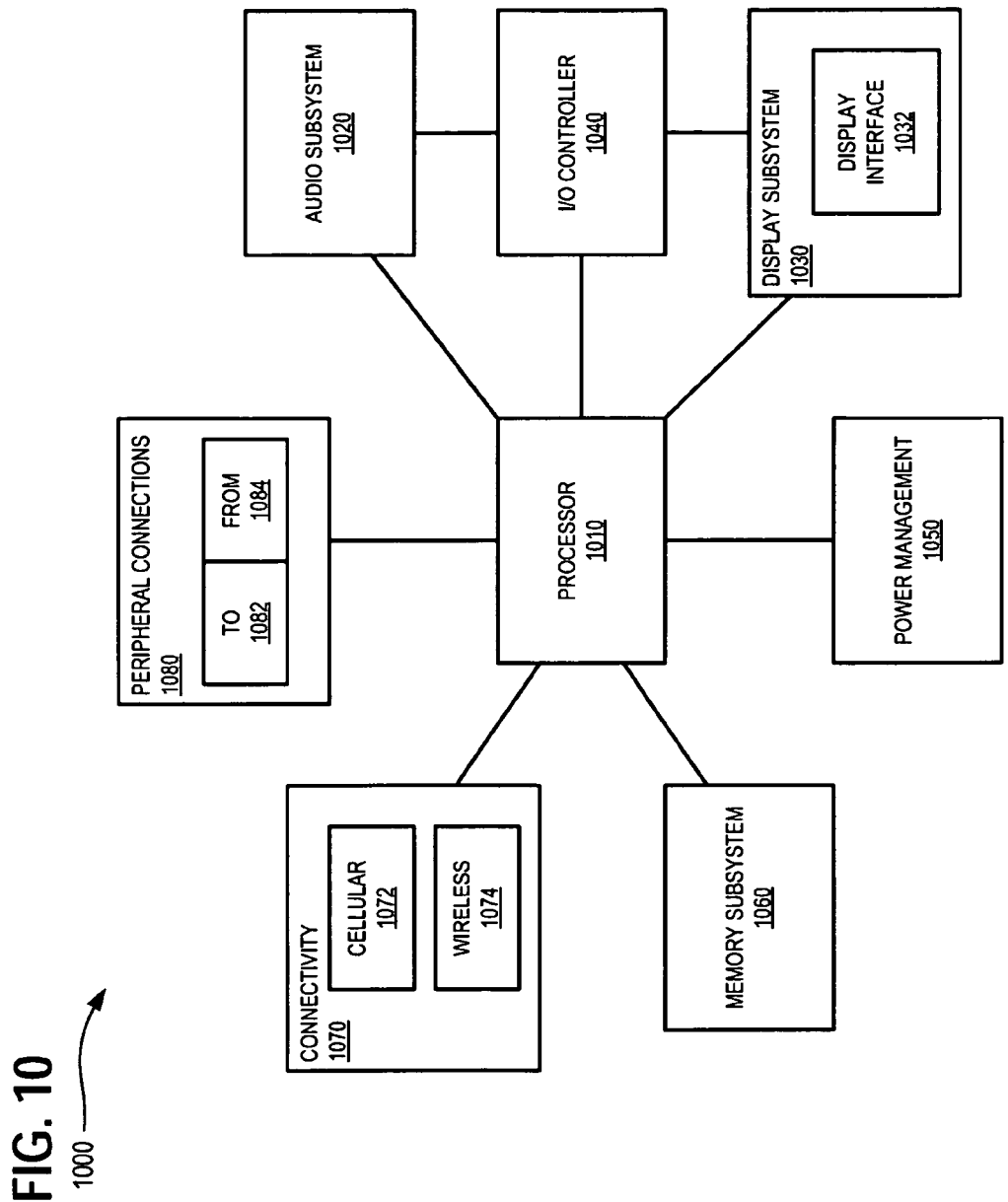
FIG. 10 is a block diagram of an embodiment of tablet computing device, a smart phone, or other mobile device in which touchscreen interface connectors are used.

FIG. 10 is a block diagram 1000 of an embodiment of tablet computing device, a smart phone, or other mobile device in which touchscreen interface connectors are used. Processor 1010 performs the primary processing operations. Audio subsystem 1020 represents hardware (e.g., audio hardware and audio circuits) and software (e.g., drivers, codecs) components associated with providing audio functions to the computing device. In one embodiment, a user interacts with the tablet computing device or smart phone by providing audio commands that are received and processed by processor 1010.

Display subsystem 1030 represents hardware (e.g., display devices) and software (e.g., drivers) components that provide a visual and/or tactile display for a user to interact with the tablet computing device or smart phone. Display subsystem 1030 includes display interface 1032, which includes the particular screen or hardware device used to provide a display to a user. In one embodiment, display subsystem 1030 includes a touchscreen device that provides both output and input to a user.

I/O controller 1040 represents hardware devices and software components related to interaction with a user. I/O controller 1040 can operate to manage hardware that is part of audio subsystem 1020 and/or display subsystem 1030. Additionally, I/O controller 1040 illustrates a connection point for additional devices that connect to the tablet computing device or smart phone through which a user might interact. In one embodiment, I/O controller 1040 manages devices such as accelerometers, cameras, light sensors or other environmental sensors, or other hardware that can be included in the tablet computing device or smart phone. The input can be part of direct user interaction, as well as providing environmental input to the tablet computing device or smart phone.

In one embodiment, the tablet computing device or smart phone includes power management 1050 that manages battery power usage, charging of the battery, and features related to power saving operation. Memory subsystem 1060 includes memory devices for storing information in the tablet computing device or smart phone. Connectivity 1070 includes hardware devices (e.g., wireless and/or wired connectors and communication hardware) and software components (e.g., drivers, protocol stacks) to the tablet computing device or smart phone to communicate with external devices. Cellular connectivity 1072 may include, for example, wireless carriers such as GSM (global system for mobile communications), CDMA (code division multiple access), TDM (time division multiplexing), or other cellular service standards). Wireless connectivity 1074 may include, for example, activity that is not cellular, such as personal area networks (e.g., Bluetooth), local area networks (e.g., WiFi), and/or wide area networks (e.g., WiMax), or other wireless communication.

Peripheral connections 1080 include hardware interfaces and connectors, as well as software components (e.g., drivers, protocol stacks) to make peripheral connections as a peripheral device ("to" 1082) to other computing devices, as well as have peripheral devices ("from" 1084) connected to the tablet computing device or smart phone, including, for example, a "docking" connector to connect with other computing devices. Peripheral connections 1080 include common or standards-based connectors, such as a Universal Serial Bus (USB) connector, DisplayPort including MiniDisplayPort (MDP), High Definition Multimedia Interface (HDMI), Firewire, etc.

Figure 11:
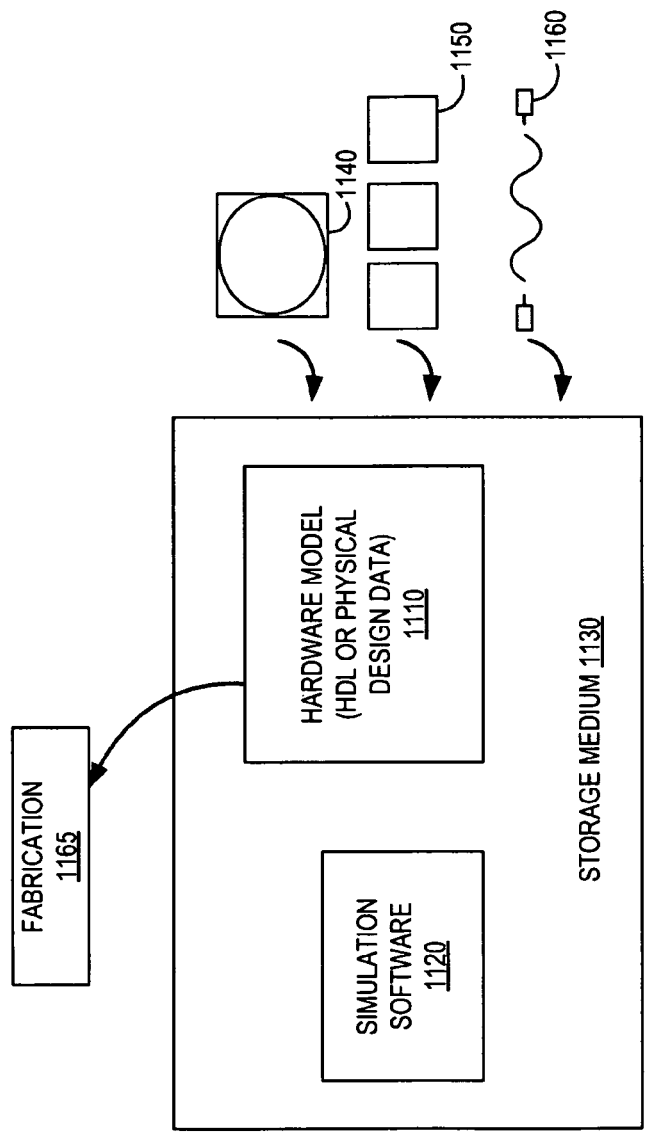
FIG. 11 is a block diagram of an IP core development system according to one embodiment.

FIG. 11 shows a block diagram illustrating the development of IP cores according to one embodiment. Storage medium 1130 includes simulation software 1120 and/or hardware or software model 1110. In one embodiment, the data representing the IP core design can be provided to the storage medium 1130 via memory 1140 (e.g., hard disk), wired connection (e.g., internet) 1150 or wireless connection 1160. The IP core information generated by the simulation tool and model can then be transmitted to a fabrication facility 1165 where it can be fabricated by a 3rd party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
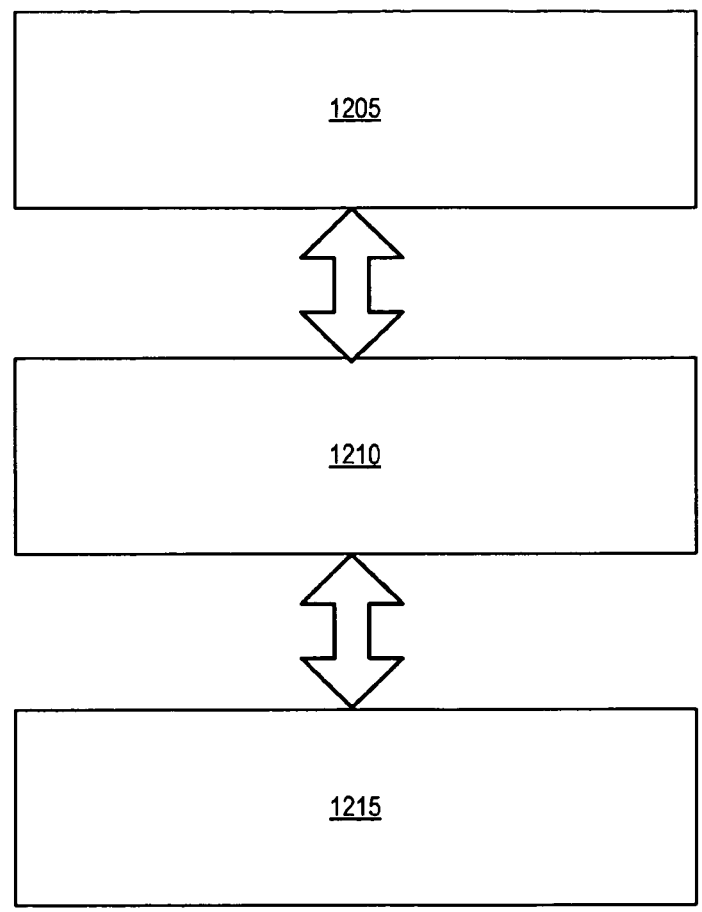
FIG. 12 illustrates an architecture emulation system according to one embodiment.

FIG. 12 illustrates how an instruction of a first type is emulated by a processor of a different type, according to one embodiment. In FIG. 12, program 1205 contains some instructions that may perform the same or substantially the same function as an instruction according to one embodiment. However the instructions of program 1205 may be of a type and/or format that is different or incompatible with processor 1215, meaning the instructions of the type in program 1205 may not be able to execute natively by the processor 1215. However, with the help of emulation logic, 1210, the instructions of program 1205 are translated into instructions that are natively capable of being executed by the processor 1215. In one embodiment, the emulation logic is embodied in hardware. In another embodiment, the emulation logic is embodied in a tangible, machine-readable medium containing software to translate instructions of the type in the program 1205 into the type natively executable by the processor 1215. In other embodiments, emulation logic is a combination of fixed-function or programmable hardware and a program stored on a tangible, machine-readable medium. In one embodiment, the processor contains the emulation logic, whereas in other embodiments, the emulation logic exists outside of the processor and is provided by a third party. In one embodiment, the processor is capable of loading the emulation logic embodied in a tangible, machine-readable medium containing software by executing microcode or firmware contained in or associated with the processor.

Figure 13:
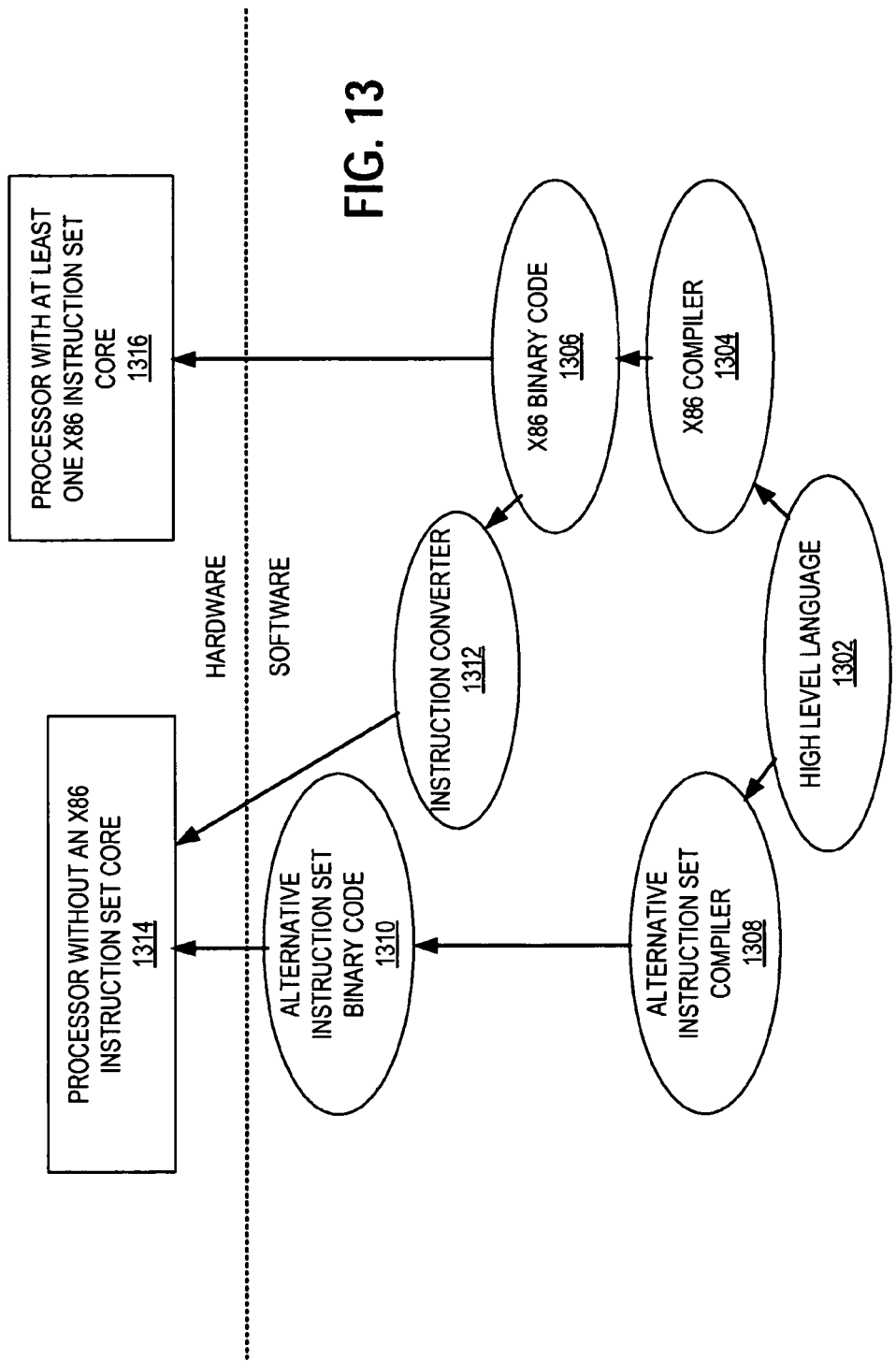
FIG. 13 illustrates a system to translate instructions according to one embodiment.

FIG. 13 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1304 represents a compiler that is operable to generate x86 binary code 1306 (e.g., object code) that can, with or without additional linkage processing, be executed on the processor with at least one x86 instruction set core 1316. Similarly, FIG. 13 shows the program in the high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1312 is used to convert the x86 binary code 1306 into code that may be natively executed by the processor without at least one x86 instruction set core 1314. This converted code is not likely to be the same as the alternative instruction set binary code 1310 because an instruction converter capable of this is difficult to make; however, the converted code will accomplish the general operation and be made up of instructions from the alternative instruction set. Thus, the instruction converter 1312 represents software, firmware, hardware, or a combination thereof that, through emulation, simulation or any other process, allows a processor or other electronic device that does not have an x86 instruction set processor or core to execute the x86 binary code 1306.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. An integrated circuit comprising:
   a data bus;
   a lower level cache communicably interfaced with the data bus;
   a higher level cache communicably interfaced with the data bus;
   one or more data buffers communicably interfaced with the data bus, each data buffer of the one or more data buffers having a buffer memory to buffer a full cache line, one or more control bits to indicate state of the data buffer, and an address associated with the full cache line;
   one or more dataless buffers, each dataless buffer of the one or more dataless buffer incapable of storing a full cache line and having one or more control bits to indicate state of the dataless buffer and an address for an inter-cache transfer line associated with the dataless buffer; and
   inter-cache transfer logic to:
      allocate one of the one or more dataless buffers to the inter-cache transfer line responsive to a cache miss at the lower level cache, and
      request the inter-cache transfer line from the higher level cache via the data bus and to write the inter-cache transfer line into the lower level cache from the data bus, bypassing the allocated dataless buffer and data buffers, when control bits in the inter-cache transfer line indicate a state exclusive or shared, wherein the inter-cache transfer line returned from the higher level cache includes a full cache line and control data, and wherein the allocated dataless buffer to store the control data via the one or more control bits, and wherein the allocated dataless buffer does not store the full cache line returned with the control data.

2. The integrated circuit of claim 1, wherein the inter-cache transfer logic to further:
   request the inter-cache transfer line responsive to the cache miss at the lower level cache.

3. The integrated circuit of claim 1, wherein the inter-cache transfer logic to direct the inter-cache transfer line from the data bus directly into the lower level cache, bypassing the allocated dataless buffer comprises the inter-cache transfer logic to initiate a replace operation to insert the inter-cache transfer line into the lower level cache.

4. The integrated circuit of claim 3, wherein the replace operation is initiated concurrently with the request for the inter-cache transfer line from the higher level cache.

5. The integrated circuit of claim 3:
wherein the replace operation comprises selecting a cache line for eviction from the lower level cache based at least in part on the cache line for eviction residing within a portion of the lower level cache for which there is no present contention; and
directing the inter-cache transfer line into a location made available through the eviction of the cache line.

6. The integrated circuit of claim 5, wherein the inter-cache transfer logic to further:
allocate one of the plurality of data buffers to buffer the evicted cache line; and
direct the evicted cache line into the allocated data buffer.

7. The integrated circuit of claim 1:
wherein the lower level cache comprises a plurality of memory cells arranged into two or more groups; and
wherein each of the two or more groups is accessed through a multiplexer (mux) enabling simultaneous write/write, read/read, or write/read operations to two distinct memory cells of the respective group.

8. The integrated circuit of claim 7, wherein the inter-cache transfer logic to write the inter-cache transfer line into the lower level cache from the data bus comprises the inter-cache transfer logic to:
identify one of the two or more groups for which a write operation is available;
select the identified group; and
direct an agent responsible for the selected group to write the inter-cache transfer line from the data bus into the selected group.

9. The integrated circuit of claim 7, wherein the inter-cache transfer logic to write the inter-cache transfer line into the lower level cache from the data bus comprises the inter-cache transfer logic to:
identify contention on all of the two or more groups;
stall write operations into one of the groups; and
direct an agent responsible for the group associated with the stalled write operations to write the inter-cache transfer line from the data bus into the group.

10. The integrated circuit of claim 1:
wherein the lower level cache is an on-chip level 1 cache (L1 cache) incorporated within the integrated circuit; and
wherein the higher level cache is an on-chip level 2 cache (L1 cache) incorporated within the integrated circuit.

11. The integrated circuit of claim 10, wherein the on-chip level 1 cache or the on-chip level 2 cache further communicates with an off-chip level 3 cache (L3 cache) to perform inter-cache transfers from the L3 cache into one of the on-chip level 1 cache or the on-chip level 2 cache.

12. The integrated circuit of claim 1:
wherein a cache update for an existing cache line stored in the lower level cache or the higher level cache is buffered in one of the one or more data buffers; and
wherein a scheduler to monitor the one or more data buffers secures an available write port to the lower level cache or the higher level cache associated with the existing cache line and writes the cache update into the lower level cache or the higher level cache to replace the existing cache line.

13. The integrated circuit of claim 1, wherein the integrated circuit comprises a central processing unit for one of a tablet computing device or a smartphone.

14. A system comprising:
a display unit; and
an integrated circuit, wherein the integrated circuit comprises
a data bus;
a lower level cache communicably interfaced with the data bus;
a higher level cache communicably interfaced with the data bus;
one or more data buffers communicably interfaced with the data bus, each data buffer of the one or more data buffers having a buffer memory to buffer a full cache line, one or more control bits to indicate state of the data buffer, and an address associated with the full cache line;
one or more dataless buffers, each dataless buffer of the one or more dataless buffers incapable of storing a full cache line and having one or more control bits to indicate state of the dataless buffer and an address for an inter-cache transfer line associated with the dataless buffer; and
inter-cache transfer logic to:
allocate one of the one or more dataless buffers to the inter-cache transfer line responsive to a cache miss at the lower level cache, and
request the inter-cache transfer line from the higher level cache via the data bus and to write the inter-cache transfer line into the lower level cache from the data bus, bypassing the allocated dataless buffer and data buffers, when control bits in the inter-cache transfer line indicate a state exclusive or shared, wherein the inter-cache transfer line returned from the higher level cache includes a full cache line and control data, and wherein the allocated dataless buffer to store the control data via the one or more control bits, and wherein the allocated dataless buffer does not store the full cache line returned with the control data.

15. The system of claim 14:
wherein the system embodies a tablet or a smartphone;
wherein the display unit comprises a touchscreen interface of the tablet or the smartphone; and
wherein the integrated circuit is incorporated into the tablet or smartphone.

16. The system of claim 14, wherein the inter-cache transfer logic to direct the inter-cache transfer line from the data bus directly into the lower level cache, bypassing the allocated dataless buffer comprises the inter-cache transfer logic to initiate a replace operation to insert the inter-cache transfer line into the lower level cache.

17. The system of claim 16, wherein the replace operation is initiated concurrently with the request for the inter-cache transfer line from the higher level cache.

18. The system of claim 16:
wherein the replace operation comprises selecting a cache line for eviction from the lower level cache based at least in part on the cache line for eviction residing within a portion of the lower level cache for which there is no present contention; and
directing the inter-cache transfer line into a location made available through the eviction of the cache line.

19. A method in an integrated circuit, the method comprising:
- receiving a cache miss at a lower level cache for which corresponding data is available at a higher level cache communicably interfaced with the lower level cache via a data bus;
- requesting an inter-cache transfer line from the upper level cache responsive to the cache miss at the lower level cache;
- allocating a dataless buffer for the inter-cache transfer line, wherein the dataless buffer is incapable of storing the inter-cache transfer line and having one or more control bits to indicate state of the dataless buffer and an address for an inter-cache transfer line associated with the dataless buffer; and
- transferring the inter-cache transfer line from the higher level cache to the lower level cache by receiving the inter-cache transfer line on the data bus and writing the inter-cache transfer line into the lower level cache from the data bus, bypassing all cache buffers, wherein the inter-cache transfer line returned from the higher level cache includes a full cache line and control data, and wherein the allocated dataless buffer to store the control data via the one or more control bits, and wherein the allocated dataless buffer does not store the full cache line returned with the control data.

20. The method of claim 19, wherein the inter-cache transfer logic directing the inter-cache transfer line from the data bus directly into the lower level cache, bypassing the allocated dataless buffer comprises the inter-cache transfer logic initiating a replace operation to insert the inter-cache transfer line into the lower level cache.

21. The method of claim 20, wherein the replace operation is initiated concurrently with the request for the inter-cache transfer line from the higher level cache.

22. The method of claim 20, wherein the replace operation comprises:
- selecting a cache line for eviction from the lower level cache based at least in part on the cache line for eviction residing within a portion of the lower level cache for which there is no present contention; and
- directing the inter-cache transfer line into a location made available through the eviction of the cache line.

* * * * *